United States Patent [19]

Nadkarni

[11] Patent Number: 5,087,592
[45] Date of Patent: Feb. 11, 1992

[54] METHOD OF PRODUCING PLATELETS OF BORIDES OF REFRACTORY METALS

[75] Inventor: Sadashiv K. Nadkarni, Lexington, Mass.

[73] Assignee: Alcan International Limited, Montreal, Canada

[21] Appl. No.: 528,856

[22] Filed: May 25, 1990

[51] Int. Cl.$^5$ ............ C04B 35/58; C01B 35/04; C01B 6/13; C01B 35/00
[52] U.S. Cl. ............ 501/96; 423/297; 423/287
[58] Field of Search ............ 501/96; 423/297, 287

[56] References Cited

U.S. PATENT DOCUMENTS

| | | | |
|---|---|---|---|
| 2,906,605 | 9/1959 | Dubeck | 423/297 |
| 3,249,401 | 3/1966 | Wood et al. | |
| 3,258,316 | 7/1966 | Tepper et al. | 423/297 |
| 3,271,109 | 9/1966 | Mezey et al. | 423/345 |
| 3,328,127 | 6/1967 | Byrns | |
| 3,351,429 | 11/1967 | Timms | |
| 3,379,647 | 4/1968 | Smudski | |
| 4,126,652 | 11/1978 | Oohara et al. | 423/345 |
| 4,376,029 | 3/1983 | Joo et al. | |
| 4,439,382 | 3/1984 | Loo et al. | |
| 4,536,379 | 8/1985 | Carlson | 423/345 |
| 4,595,545 | 6/1986 | Sane | |
| 4,647,405 | 3/1987 | Debely | 501/96 |
| 4,702,900 | 10/1987 | Kurachi et al. | 423/345 |
| 4,756,895 | 7/1988 | Boecker et al. | 423/345 |
| 4,812,425 | 3/1989 | Walker, Jr. | |

FOREIGN PATENT DOCUMENTS

| | | |
|---|---|---|
| 2518950 | 11/1975 | Fed. Rep. of Germany |
| 432216 | 1/1968 | Japan |
| 2272032 | 4/1977 | Japan |
| 50160200 | 12/1975 | Japan |
| 57071869 | 5/1982 | Japan |
| 58204812 | 11/1983 | Japan |
| 60081064 | 3/1985 | Japan |
| 7505601 | 11/1975 | Netherlands |
| 7501762 | 11/1975 | Norway |

OTHER PUBLICATIONS

Kim & McMurtry-Ceramic Engineering Science Proc. 1985 6 (9-10), 1313-1320-"TiB$_2$ Powder Production for Engineered Ceramics".
Walker-Advanced Ceramic Materials-1988 3 (6), 601-4.
Makoto et al-Osaka Kogyo Gijutsu Shikenjo Kiho (Abstract only).

*Primary Examiner*—William R. Dixon, Jr.
*Assistant Examiner*—C. Melissa Bonner
*Attorney, Agent, or Firm*—Cooper & Dunham

[57] ABSTRACT

A method of producing platelets of refractory metal borides and the platelets so-produced. The method involves reacting an oxide of a refractory metal or a precursor thereof and B$_2$O$_3$ or a precursor thereof with carbon or a carbon precursor in the presence of a small amount of an alkali metal oxide, such as sodium oxide or potassium oxide, or a precursor. The reaction should take place under an atmosphere of an inert (non-reactive) gas. The alkali metal oxide allows the reaction temperature to be brought below 1800° C., which reduces impurities in the product, and affects the shape of the particulate boride product, resulting in the formation of platelets. The carbon used in the reaction is preferably derived from calcined anthracite coal or petroleum coke because such carbon sources permit the reaction to be carried out at lower temperatures. The platelets of the refractory metal borides so-produced can be used as reinforcements for ceramic or metal matrix composites or for other purposes.

21 Claims, 3 Drawing Sheets

METHOD OF PRODUCING PLATELETS OF BORIDES OF REFRACTORY METALS

BACKGROUND OF THE INVENTION

I. Field of the Invention

This invention relates to a method of producing platelets of refractory metal borides and to the platelets so-produced.

II. Description of the Prior Art

Ceramic materials in the form of discrete particles are of increasing interest nowadays because of their ability to reinforce composite materials having metal or ceramic matrices. Refractory hard borides are of particular interest in this regard because of their high strength, inertness and ability to resist high temperatures. When such materials are in the form of platelets (single crystals which grow preferentially in two dimensions and have aspect ratios of at least 5) in the size range of 10–20 microns, a very strong reinforcing effect can be expected because of the non-spherical nature of the particles.

$TiB_2$ is an especially useful reinforcing material for metal matrices containing aluminum because $TiB_2$ is one of the few refractory materials which are both wettable by molten aluminum and unreactive with it. However, platelets of this material are not currently commercially available. Even when platelets of suitable refractory metal borides are available, they tend to be very expensive, and are often contaminated with other types of particles, such as spherical particles or whiskers which may not be desirable for matrix reinforcement.

A variety of methods are known for the preparation of refractory metal borides in the form of particles. For example, it is known that titanium diboride can be produced by a carbothermal process by reacting titanium dioxide, boron carbide and carbon at high temperature. The reaction involved is illustrated below:

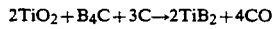
$2TiO_2 + B_4C + 3C \rightarrow 2TiB_2 + 4CO$

The equilibrium temperature of this process is 886° C. but, in practice, the temperature has to be maintained well above this level in order to achieve sufficiently high reaction rates. Disadvantageously, reaction temperatures above 1800° C. are generally required and platelets are rarely formed. The requirement for the prior synthesis of the boron carbide also reduces the attractiveness of the process.

$TiB_2$ particles can also be produced by direct reaction between $TiO_2$, $B_2O_3$ and C. The reaction involved is shown below:

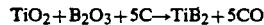
$TiO_2 + B_2O_3 + 5C \rightarrow TiB_2 + 5CO$

The equilibrium temperature for this reaction is 1365° C. but, in practice, much higher temperatures (again above 1800° C.) are required in order to achieve satisfactory conversion in a reasonable time. This may be because intermediate titanium oxycarbides are formed, which require temperatures above 1800° C., and preferably close to 2000° C., for the formation of $TiB_2$. At these temperatures, $B_2O_3$ volatilizes and it therefore becomes difficult to maintain the proper ratio of the starting materials, so the resulting product contains an excess of oxide or carbon. In view of this, this method of synthesis is not used in commercial production processes.

Other processes for the synthesis of $TiB_2$ include gas phase synthesis by reactions between $TiCl_4$, $BCl_3$ and $H_2$, but this is expensive and difficult to operate on a commercial scale.

In general, the products of the above reactions and similar reactions for the production of borides of other refractory metals tend to form products which comprise an agglomeration of particles having sizes and shapes which are not very suitable for matrix reinforcement.

Prior patents and articles which describe the formation of titanium diboride and borides or carbides of other refractory metals include the following: (1) Kim, J. J and McMurtry, C. H., Ceramic Engineering Sci. Proc., 1985, 6 (9–10): (2) Walker, J. K., Advanced Ceramic Materials 1988, 3 (6), 601–4; (3) Japanese patent publication JP 43-2216 to Doi, Y.; (4) Mokoto, K. et al, Osaka Kogyo Gijutsu Shikenjo Kiho, 18(1), 72–7; (5) U.S. Pat. No. 4,812,425 to Walker Jr.; (6) U.S. Pat. No. 3,328,127 to Byrns; (7) U.S. Pat. No. 3,351,429 to Timms; (8) U.S. Pat. No. 3,249,401 to Wood et al; (9) U.S. Pat. No. 4,376,029 to Joo et al; (10) U.S. Pat. No. 4,439,382 to Joo et al; (11) U.S. Pat. No. 4,595,545 to Sane; and (12) U.S. Pat. No. 3,379,647 to Smudski. These patents and articles do not disclose processes which can be used reliably, and on a commercial scale, for the formation of refractory platelets.

There is therefore a need for improved methods of producing borides of titanium and other refractory metals which can result in the formation of platelets.

An object of the present invention is consequently to provide a method of producing such products.

SUMMARY OF THE INVENTION

According to one aspect of the invention, there is provided a method of producing substantially unagglomerated particles of borides of refractory metals, which method comprises reacting an oxide of said refractory metal or a precursor thereof with carbon or a precursor thereof and $B_2O_3$ or a precursor thereof, at an elevated temperature below about 1800° C. in the presence of an alkali metal oxide or a precursor thereof in an amount sufficient for at least some of said particles to be in the form of platelets.

The invention also relates to platelets of borides of refractory metals produced by the above method and to composite materials employing such platelets as reinforcements.

The refractory metals (i.e. metals of high melting point) to which the present invention relates include titanium, zirconium, scandium and yttrium, although the latter two elements are so rare and expensive that their borides are unlikely to be of commercial interest. The invention does not relate to the formation of borides of silicon (which is not considered to be a refractory metal) and, at present, the invention has not been effective for tungsten, although this may be due to minor processing difficulties which could possibly be overcome.

DETAILED DESCRIPTION OF THE INVENTION

Figure 1:
FIGS. 1 to 6 are photomicrographs of platelets produced according to the Examples below.

The present invention is based, at least in part, on the finding that alkali metal oxides, when used in relatively small amounts, have the ability to affect the shape and size of boride produced by the direct reaction of metal oxides with carbon and $B_2O_3$ (or precursors thereof).

While all alkali metal oxides may be effective in the present invention, sodium oxide ($Na_2O$) and potassium oxide ($K_2O$) are preferred, with sodium oxide being the most preferred. These alkali metal oxides are subsequently eliminated by reaction with carbon to give a volatile metal.

The oxides of the alkali metals enable the reaction temperature to be kept below about 1800° C. and result in the formation of a substantially unagglomerated product which contains a substantial quantity of platelets or consists substantially entirely of platelets.

Without wishing to be bound by a particular theory, the alkali metal oxides used in the present invention are believed to act in the following way, using sodium oxide as an example and showing its effect during the formation of titanium diboride. During the reaction, the $Na_2O$ is believed to react with the $B_2O_3$ to form sodium metaborate at relatively low temperatures. The reaction involved is shown below:

$$Na_2O + B_2O_3 \rightarrow 2NaBO_2$$

The sodium metaborate thus formed can dissolve the $TiO_2$ at temperatures above 1000° C. Thus, in the presence of $Na_2O$, the reaction between $TiO_2$, $B_2O_3$ and C can be changed from one involving two solids and a liquid to one involving a solid and a liquid. This helps to increase the kinetics of the reaction by a substantial magnitude:

$$2NaBO_2 + TiO_2 + 6C \rightarrow 2Na(g) + TiB_2 + 6CO$$

The equilibrium temperature for this reaction is 1435° C. The Na thus formed can react with additional $B_2O_3$ and $TiO_2$ to yield $TiB_2$ and $NaBO_2$:

$$6B_2O_3 + 10Na(g) + TiO_2 \rightarrow TiB_2 + 10NaBO_2$$

Thus, a small amount of $Na_2O$ is adequate to produce $NaBO_2$ continuously, dissolve the $TiO_2$ and allow the reaction to be conducted at a lower temperature.

If the amount of $Na_2O$ is too high, however, $B_2O_3$ may be lost as $NaBO_2$ since this material has a higher vapour pressure than $B_2O_3$ at corresponding temperatures. As a consequence, the product may then contain TiC. Increasing amounts of $Na_2O$ also tend to produce smaller platelets. If smaller platelets are desired, the loss of $B_2O_3$ may have to be compensated for by the use of larger amounts of this starting material.

In general, it is found that the amount of $Na_2O$ should be in the range of from about 1 to 30% by weight, and more preferably 1 to 15% by weight, of the $B_2O_3$ present in the reaction mixture. If the amount is less than about 1% of the $B_2O_3$, platelets are not formed at a reasonable rate at temperatures below 1800° C. If the amount is in excess of 30% of the $B_2O_3$, the product normally contains unacceptable amounts of TiC. The 1-15% range produces acceptably large, unagglomerated and substantially uncontaminated particles.

It is believed that alkali metal oxides act in similar ways for the formation of platelets of $ZrB_2$, etc.

As stated earlier, the invention can be carried out (if desired) using precursors of the various starting materials. Suitable precursors of the refractory metal oxides include carbonates and hydroxides. Suitable precursors of the $B_2O_3$ include boric acid, boron anhydride and trimethyl borate. Precursors of the alkali metal oxides include carbonates, oxalates, acetates, bicarbonates, nitrates, and other oxygen-containing compounds.

While a variety of conventional carbon precursors may be employed, it is preferable to use carbon itself in the reaction of the invention. In fact, it has been found that the use of carbon derived from particular carbon sources results in a higher rate of conversion of the starting materials to the desired platelet products at the temperatures employed in the present invention. The sources of carbon which are effective in this regard are liquid and solid sources such as non-graphitizable hard carbon, particularly calcined anthracite coal, and petroleum coke. Carbon derived from gaseous sources and from synthetic polymers is not preferred.

Anthracite coal is a naturally occurring source of non-graphitizable hard carbon which normally contains impurities such as Fe, Si, Al, Ca, Ti, etc. These impurities, after calcination of the anthracite, are present as carbides. It is believed that the presence of such impurities in anthracite increases its reactivity with oxides of refractory metals and $B_2O_3$, although the improved reactivity may also be due, at least in part, to the disordered physical structure of the anthracite (as shown by the fact that, even upon heating, the anthracite cannot be transformed into a crystalline form).

Anthracite, which generally contains less than about 10% by weight of volatile materials (normally 7–10%) and less than about 10% by weight of ash remaining after combustion (normally 4–10%), is available from various mines around the world, but Pennsylvania anthracite is particularly preferred in the present invention because of its superior results. This anthracite is extremely dense (real density over 1.80) with porosity of less than 10%. A typical electrically calcined (1800°–2200° C.) Pennsylvania anthracite composition in percent by weight is shown in Table 1 below:

TABLE 1

| % Si | 1.3–2.0 |
| % Al | 1.1–1.3 |
| % Fe | 0.3–0.6 |
| % S | 0.3 |
| % Ca | 0.05–0.20 |
| % Ash | 6–10 |
| % Carbon | Balance |

The anthracite must be calcined before use at a temperature above about 1500° C. (preferably 1600°–2200° C. and optionally about 1800° C.). The only practical way of doing this is by electrical calcination during which an electrical current is passed directly through the coal. The calcination is carried out under a non-oxidizing atmosphere (e.g. an atmosphere of Ar, a vacuum, or the atmosphere generated by the reactants themselves) for a time suitable for the removal of substantially all of the volatiles (usually a few hours). The calcined product should be allowed to cool in the same non-oxidizing atmosphere. The calcined product usually contains 90–96% by weight of carbon, with the remainder being ash. The calcination step also converts the impurities from oxides to carbides.

Petroleum coke is also preferred for use as a carbon precursor in the present invention. This is a well known product available from many sources and such coke of any type from any source can be employed. Petroleum coke is generally produced by calcining green petroleum coke, which is in turn produced by the cokifaction of the residuum resulting from the distillation of petroleum. Petroleum coke contains impurities similar to those in anthracite coal and is thus believed to affect the reaction of the invention for the same reasons as the anthracite coal.

The reaction temperature employed in the present invention can be as low as about 1550° C. while still retaining a reasonable reaction rate. The preferred temperature range is therefore 1550°–1800° C., but the optimum temperature depends on the identity of the refractory metal oxide. Temperatures in the range of about 1600°–1700° C. are often the most preferred.

Prior to the reaction, the reactants are mixed together in proportions suitable for the formation of the desired products. The proportions are preferably substantially stoichiometrical in order to avoid the presence of excess unreacted starting materials in the product. However, variations from the stoichiometrical amounts may sometimes be desired. For example, in the case of the carbon, a variation of about ±10% by weight from the stoichiometrical amount is often required for the formation of borides in order to reduce, or eliminate completely, the formation of the corresponding carbide possibly caused by a localized excess of carbon during the reaction step. Furthermore, the $B_2O_3$ may have to be increased at higher concentrations of alkali metal oxides for the reason mentioned earlier.

The particle size of the starting materials is not particularly pertinent, but it is preferable to use particles smaller than about 200 Tyler mesh in order to facilitate the preparation of a uniform mixture of the starting materials. The mixing of the starting materials should be done as thoroughly as possible and the use of V mixers is preferred because such mixtures are very effective for the mixing of two or more solids.

The reaction, which may be operated on a continuous or batchwise basis, is normally carried out in a closed furnace having walls made of graphite. The reaction should preferably be conducted under an inert (unreactive) atmosphere, e.g. under an atmosphere of argon, but can be carried out in air, if desired, especially at lower temperatures in the effective range. Nitrogen cannot normally be used as a protective gas for the boride-forming reaction because BN is undesirably formed. The reaction time is normally within the range of 2 to 3 hours (at a temperature of about 1600° C.), but the reaction time depends on the identity of the product being formed and on the reaction temperature, with longer reaction times being required at lower temperatures. Following the reaction, the product is preferably allowed to cool, desirably under an unreactive atmosphere.

The product of the invention is generally in the form of platelets having diameters in the range of 5 to 30 microns. The platelets are usually completely unagglomerated or so weakly agglomerated that they can be separated by gentle attrition. If desired, the platelets so-produced can be converted into other shapes and sizes by comminution, e.g. by jet-milling or other grinding processes, followed by classification to separate the desired particle shapes and sizes.

The platelets produced by the invention can be used for reinforcement of ceramic or metal matrices in the conventional way. The reinforcement of a metal matrix of aluminum or an alumina alloy by $TiB_2$ platelets is especially desirable.

The invention is illustrated further by the following non-limiting Examples.

EXAMPLE 1

Platelets of $TiB_2$ were produced by reacting 80 parts by weight of $TiO_2$ with 70 parts by weight of $B_2O_3$, a stoichiometrical amount of carbon in the form of calcined anthracite, having a particle size of less than 50 microns, and 5–15 parts by weight of $Na_2CO_3$. The reaction was carried out at a temperature of 1650° C. for a period of three hours in air.

The resulting platelets were hexagonal in shape, about 10–30 microns in size and substantially unagglomerated.

EXAMPLE 2

Figure 2:
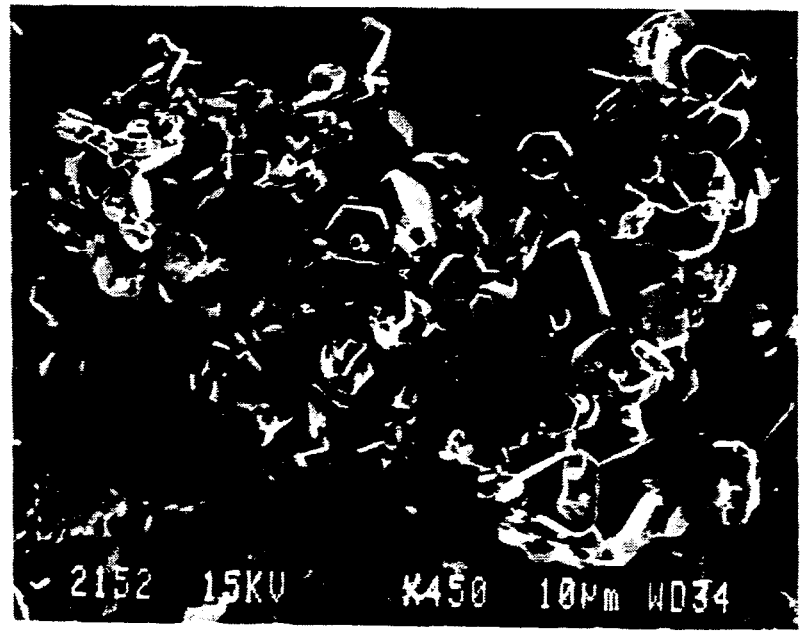

$TiO_2$, $B_2O_3$, anthracite and $Na_2CO_3$ were mixed together in the ratio 80:70:60:10. A reaction was carried out at 1650° C. The product yield was 32.8% (theoretical yield 31.8%). The product was examined under SEM (scanning electron microscopy). It comprised platelets around 10–30 microns in size (FIGS. 1 and 2). KEVEX (energy dispersive X-ray fluorescence) analysis did not show any carbon peak. Only a Ti peak could be seen.

EXAMPLE 3

Figure 3:

This Example was similar to Example 2 except that the ratio of $TiO_2:B_2O_3$:anthracite:$Na_2CO_3$ was changed to 80:70:60:15. The product yield was 31.8% (theoretical yield 30.9%). A photograph of the product is shown in FIG. 3. The product comprised essentially platelets. XRD (x-ray diffraction) analysis confirmed that $TiB_2$ was the major component of the product. A minor component was TiC.

EXAMPLE 4

Figure 4:
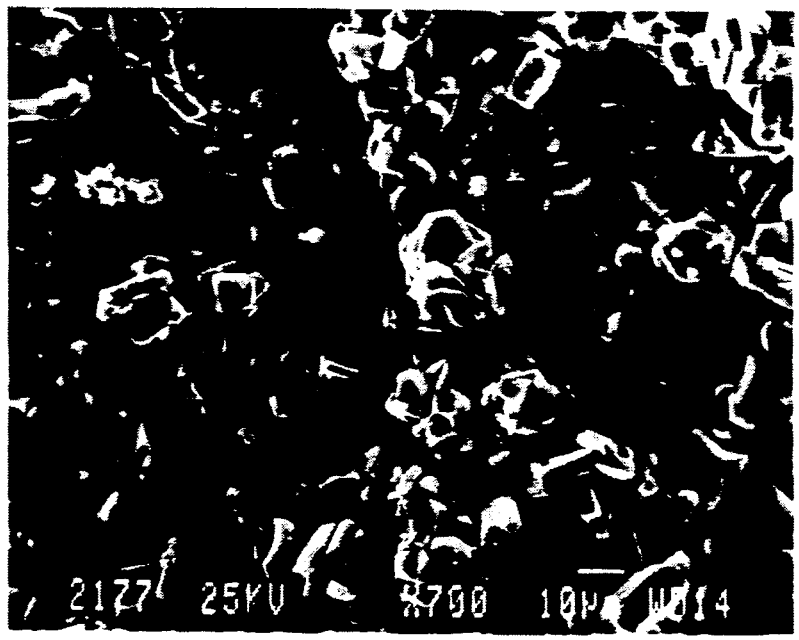

This Example was similar to the previous two except the ratio of $TiO_2:B_2O_3$:anthracite:$Na_2CO_3$ was changed to 80:70:60:5. The product comprised platelets but they were smaller in size compared to Example 3 (FIG. 4). XRD analysis confirmed that the major component was $TiB_2$ and minor component was TiC. The product yield was 34.0% compared to the theoretical yield of 32.4%.

It is believed that the TiC can be eliminated completely by increasing the concentration of $B_2O_3$ to compensate for the losses of $NaBO_2$.

EXAMPLE 5

Figure 5:
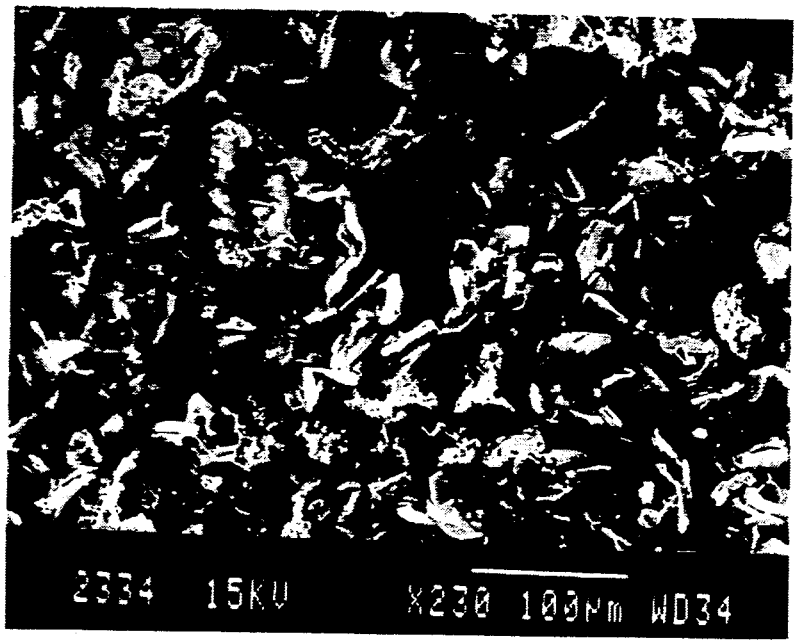

$TiO_2$, $B_2O_3$, petroleum coke (-325 mesh fraction) and $Na_2CO_3$ were mixed together in the ratio 80:70:60:15 in a V blender. The reaction was carried out at 1650° C. for 3 hours. The product yield was 32.3%. A SEM photograph is shown in FIG. 5.

EXAMPLE 6

Figure 6:
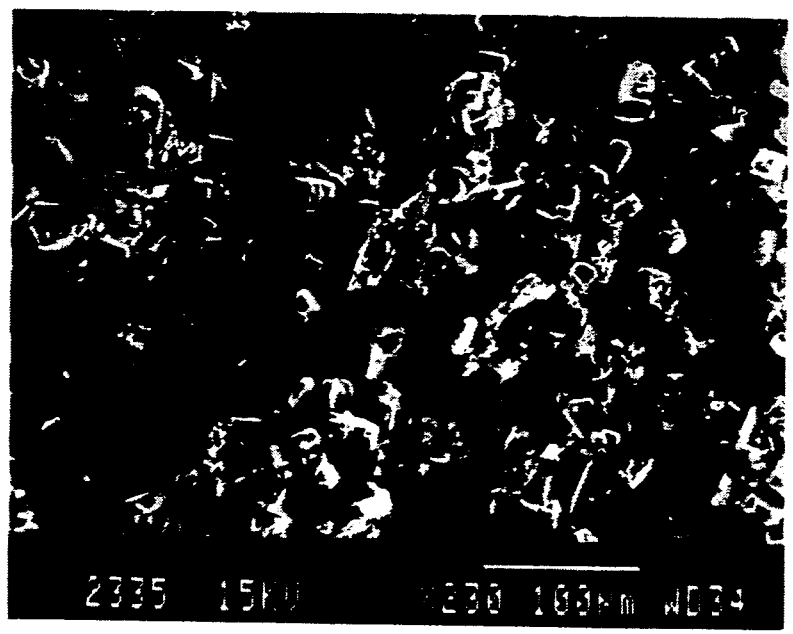

$TiO_2$, boric acid, anthracite (FT-12) and $Na_2CO_3$ were mixed together in the ratio 80:124:60:15. The product yield was 25.6%. The product was examined under SEM. A photograph is shown in FIG. 6.

COMPARATIVE EXAMPLE 1

$TiO_2$ (pigment grade from Tioxide), $B_2O_3$ and carbon black were mixed together in the ratio 80:70:60. A reaction was carried out in a batch furnace at 1550° C. for 3 hours. The product yield was 44.4% (theoretical yield: 33.14%). The product was examined under SEM and analyzed by KEVEX (energy dispersive X-ray fluorescence analysis). The product appeared to be shaped as large agglomerates. KEVEX analysis showed a significant peak for carbon indicating that the conversion was incomplete. The same conclusions can also be drawn from the yield which was significantly higher than theoretical.

COMPARATIVE EXAMPLE 2

This Comparative Example was very similar to the previous one except that in addition to $TiO_2$, $B_2O_3$ and carbon black, 106 parts of $Na_2CO_3$ were also added to the mixture of the reactants. The product yield was 25% compared to the theoretical yield of 22.03%. The product was lumpy and contained carbon as analyzed by KEVEX. The reaction appeared to have gone to a higher extent than in the previous case. In both cases, there was no trace of Na in the product indicating that it had been completely eliminated from the system.

COMPARATIVE EXAMPLE 3

$TiO_2$, $B_2O_3$ and anthracite (F 12) were mixed together in the ratio 80:70:60. The reaction was carried out at 1550° C. for 3 hours. The product yield was 37.4% (theoretical yield 33.33%). KEVEX analysis did not show any carbon peak. The product appeared to be particulate in nature. Individual particles were around 1 micron in size but they were substantially agglomerated.

COMPARATIVE EXAMPLE 4

$TiO_2$, $B_2O_3$, anthracite and $Na_2CO_3$ were mixed together in the ratio 80:70:60:106. The reaction was carried out at 1550° C. for 3 hours under an argon atmosphere. The product yield was 22.3%. Although this matched the theoretical yield, XRD analysis showed that the product contained both $TiB_2$ and $TiC$. The product also was particulate (about 1 micron in size) but it also contained a few platelets.

COMPARATIVE EXAMPLE 5

$TiO_2$, $B_2O_3$ and anthracite were mixed together in the ratio 80:70:60. The reaction was carried out at 1650° C. for 3 hours. The product yield was 34.9% (theoretical yield 33.33%). The product was substantially agglomerated and particulate in nature.

I claim:

1. A method of producing substantially unagglomerated particles of borides of refractory metals, which method comprises:
   reacting an oxide of said refractory metal or a precursor thereof with carbon or a precursor thereof and $B_2O_3$ or a precursor thereof, at an elevated temperature below about 1800° C. in the presence of an alkali metal oxide or a precursor thereof in an amount sufficient for at least some of said particles to be in the form of platelets.

2. A method according to claim 1, wherein said carbon is derived from a source selected from the group consisting of calcined anthracite coal and petroleum coke.

3. A method according to claim 1 wherein the reaction is carried out at a temperature in the range of 1550°-1800° C.

4. A method according to claim 1 wherein the reaction is carried out at a temperature in the range of 1600°-1700° C.

5. A method according to claim 1 wherein the amount of said alkali metal oxide is in the range of 1 to 30% by weight based on the weight of said $B_2O_3$.

6. A method according to claim 1 wherein the amount of said alkali metal oxide is in the range of 1 to 15% by weight based on the weight of said $B_2O_3$.

7. A method according to claim 1 wherein said precursor of $B_2O_3$ is selected from the group consisting of boric acid, boron anhydride and trimethyl borate.

8. A method according to claim 1 wherein said refractory metal is a refractory metal other than tungsten.

9. A method according to claim 1 wherein said refractory metal is selected from the group consisting of Ti, Zr, Sc and Y.

10. A method according to claim 1 wherein said refractory metal is Ti.

11. A method of producing substantially unagglomerated particles of borides of refractory metals, which method comprises:
    reacting an oxide of said refractory metal or a precursor thereof with carbon or a precursor thereof and $B_2O_3$ or a precursor thereof, at an elevated temperature below about 1800° C. in the presence of an alkali metal oxide selected from the group consisting of sodium oxide or potassium oxide, or a precursor thereof in an amount sufficient for at least some of said particles to be in the form of platelets.

12. A method of producing substantially unagglomerated particles of borides of refractory metals, which method comprises:
    reacting an oxide of said refractory metal or a precursor thereof with carbon or a precursor thereof and $B_2O_3$ or a precursor thereof, at an elevated temperature below about 1800° C. in the presence of sodium oxide or a precursor thereof in an amount sufficient for at least some of said particles to be in the form of platelets.

13. A method according to claim 1 wherein said reaction is carried out under an atmosphere of an unreactive gas.

14. A method according to claim 13 wherein said unreactive gas comprises argon.

15. A method according to claim 1 wherein said refractory metal oxide, said $B_2O_3$ and said carbon, or said precursors thereof, are employed in substantially stoichiometrical amounts.

16. A method according to claim 1 wherein said precursor of said refractory metal oxide is selected from the group consisting of carbonates and hydroxides of said refractory metals.

17. A method according to claim 1 wherein said precursor of said $B_2O_3$ is selected from the group consisting of boric acid, boron anhydride and trimethyl borate.

18. A method of producing substantially unagglomerated particles of borides of refractory metals, which method comprises:
    reacting an oxide of said refractory metal or a precursor thereof with carbon or a precursor thereof and $B_2O_3$ or a precursor thereof, at an elevated temperature below about 1800° C. in the presence of a precursor of an alkali metal oxide selected from the group consisting of carbonates, oxalates, acetates, bicarbonates, nitrates and other oxygen-containing compounds of said alkali metals, in an amount sufficient for at least some of said particles to be in the form of platelets.

19. Substantially unagglomerated platelets of refractory metal borides of about 5 to 30 microns in diameter produced according to a method according to claim 1.

20. Platelets according to claim 19 having diameters in the range of 10-30 microns.

21. Particles of refractory metal borides produced by comminuting particles according to claim 19.

* * * * *